: 2,884,422
PHTHALOPERINE AND PHTHALOPERINONE DERIVATIVES

Frank Hayhurst Slinger, Donald Graham Wilkinson, and Harold Thompson Howard, Manchester, England, assignors to Imperial Chemical Industries Limited, London, England, a corporation of Great Britain No Drawing. Application October 1, 1956
Serial No. 612,958

Claims priority, application Great Britain
October 7, 1955

7 Claims. (Cl. 260—251)

This invention relates to new polycyclic compounds.
According to our invention we provide new polycyclic compounds of the formula:

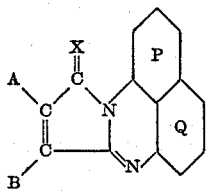

wherein X is $Cl_2$, $Br_2$, S or NH, A and B may be hydrocarbon or substituted hydrocarbon radicals or may be joined together to form a homocyclic or heterocyclic ring system, and the nuclei P and Q may carry substituents.

The groups A and B may be the same or different and may be substituted or unsubstituted alkyl, aryl, aralkyl or cycloalkyl radicals. As substituents there may be mentioned for example halogen atoms. When A and B together form a ring system, for example a benzene ring, this may carry substituents for example halogen atoms, alkyl, alkyloxy, aryl, aryloxy or nitro groups.

The substituents in the nuclei P and Q may be for example halogen atoms or alkyloxy groups or the nuclei may be substituted by an ethylene radical connected to the carbon atoms in the peri positions.

The new compounds in which X is $Cl_2$, $Br_2$ or S may be made from the corresponding keto compounds by methods known from the literature or used in practice for replacing the oxygen atom of C═O groups by chlorine, bromine or sulphur for example by reaction with phosphorus pentachloride, phosphorus pentabromide or phosphorus pentasulphide. As specific examples of compounds obtainable by this method of manufacture there may be mentioned 12:12-dichlorophthaloperine and 12-thiophthaloperinone which may be made by the action of phosphorus pentachloride and phosphorus pentasulphide respectively on 12-phthaloperinone.

Alternatively the new compounds in which X is S may be made from the corresponding dihydrogen compound, that is to say the parent compound carrying 2 atoms of hydrogen in this position, by methods known from the literature or used in practice for replacing the hydrogen atoms of methylene groups by sulphur. For example 12-thiophthaloperinone may be made by heating phthaloperine with sulphur.

The new compounds in which X is NH or S may be made by heating 1:8-naphthylene diamine or the appropriately substituted 1:8-naphthylene diamine with a dinitrile of the formula:

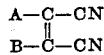

or a cyanothioamide of the formula:

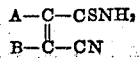

or with a compound containing a 5-membered ring which in one of its tautomeric forms has the formula:

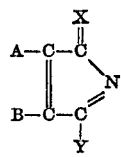

or with an alcohol addition product or mercaptan addition product thereof wherein A, B and X have the meaning given above and Y is a replaceable monovalent atom or group.

As an example of a suitable dinitrile there may be mentioned phthalonitrile and as an example of a suitable cyanothioamide there may be mentioned o-cyano-thiobenzamide.

The group Y in the above formula may be for example O-Alkyl, —SH, —S-Alkyl, —$NH_2$ or —NHR where R is a hydrocarbon or substituted hydrocarbon radical. As specific examples of suitable ring compounds there may be mentioned 1-imino-3-amino-isoindolenine, iminothiophthalimidine (a tautomeric form of 1-imino-3-mercapto-isoindolenine), 1-imino-3-ethyl-mercapto-isoindolenine, dithiophthalimide (a tautomeric form of 1-thio-3-mercapto-isoindolenine), 1 - imino - 3 - anilino - isoindolenine, 1-phenylimino-3-anilino-isoindolenine, 4:5:6:7-tetrahydro-1-imino-3-amino-isoindolenine and 5-phenyl-1-imino-3-amino-isoindolenine. As suitable alcohol and mercaptan addition products there may be mentioned 1-imino-3:3-dibenzylmercapto-isoindoline, 1-imino-3:3-diethoxy - isoindoline and 1 - imino-3:3-(ethylene-dioxy)-isoindoline.

The new polycyclic compounds of our invention are coloured compounds of good fastness to light and they are of value for use as pigments for example for colouring plastic media and for the mass colouration of artificial fibres such as viscose cellulose acetate, nylon, and polyacrylonitrile fibres.

The new compounds are also of value as intermediates for dyestuffs and other synthetic substances.

The invention is illustrated but not limited by the following examples in which the parts are by weight:

*Example 1*

27 parts of phthaloperinone and 21 parts of phosphorus pentachloride are added to 120 parts of monochlorobenzene and the mixture is stirred and boiled under a reflux condenser for 3 hours. The mixture is cooled and the solid product, which crystallises out is filtered off, washed with petroleum, dried and crystallised from benzene when it is obtained in the form of orange-red needle-shaped crystals which melt at 208–210° C.

*Example 2*

3 parts of 1:8-naphthylene diamine and 3 parts of iminothiophthalimidine (1-imino-3-thio-isoindoline) are added to 13 parts of o-dichlorobenzene and the mixture is stirred and heated under a reflux condenser at 140–150° C. for 2 hours. Ammonia and some hydrogen sulphide are evolved during the reaction. The deep crimson coloured reaction mixture is cooled and then diluted with a little benzene and petrol and the crystalline product is separated by filtration. It is washed with hot alcohol and dried. The dark purple product so formed is crystallised from toluene when it is obtained in the form of dark red purple needle-shaped crystals which melt at 223–224° C. The product is 12-thiophthaloperinone. On analysis the product is found to contain 75.5% of carbon, 3.3% of hydrogen, 9.4% of nitrogen and 9.9% of sulphur. ($C_{18}H_{10}N_2S$ requires 75.5% of carbon, 3.5% of hydrogen, 9.8% of nitrogen and 11.2% of sulphur.)

Example 3

A mixture of 100 parts of phthaloperine, 14 parts of sulphur, 100 parts of naphthalene and 0.1 part of iodine is stirred at 180° C. for 1 hour after which time the evolution of hydrogen sulphide has almost ceased. The deep red reaction mixture is dissolved in 500 parts of hot benzene and the solution is allowed to cool and stand for 24 hours. The dark red purple crystals which have then separated are filtered off and dried. The product is identical with the product of Example 2.

Example 4

20 parts of 1:8-naphthylene diamine and 20 parts of 1-imino-3-amino-isoindolenine are stirred with 110 parts of dry nitrobenzene at 125° C. for 3 hours. Ammonia is evolved during the reaction. The reaction mixture is then allowed to cool and the orange crystalline product in suspension is filtered off, washed with nitrobenzene, then with benzene and dried. The 12-imino-phthaloperine thus obtained melts at 300–305° C. It dissolves in strong sulphuric acid to form a bright reddish blue solution. On analysis the product is found to contain 80.4% carbon, 4.3% of hydrogen and 15.4% nitrogen. ($C_{18}H_{11}N_3$ requires 80.3% of carbon, 4.1% of hydrogen and 15.6% of nitrogen.)

Example 5

12 parts of sodium are added to 2500 parts of 2-ethoxy-ethanol, 870 parts of 1:8-naphthylenediamine are added and the solution is stirred at 130° C. 640 parts of phthalonitrile are then added during 10 minutes and the mixture is stirred for 3 hours at 130° C. Ammonia is evolved from the reaction mixture during this time. The reaction mixture is then cooled and the orange crystalline product in suspension is filtered off, washed with alcohol and dried. The product is identical with the compound of Example 4.

Example 6

16 parts of 1:8-naphthylene diamine and 19 parts of 1-imino-3-ethylmercapto-isoindolenine are stirred with 60 parts of nitrobenzene at 100–110° C. for 2 hours during which time ethyl mercaptan is evolved. The mixture is cooled and the orange crystalline product is filtered off, washed first with nitrobenzene, then with hot alcohol and dried. The product is identical with the compound of Example 4.

Example 7

5 parts of 1-imino-3:3-ethylenedioxy-isoindoline and 4.2 parts of 1:8-naphthylene diamine are stirred with 2 parts of technical o-dichlorobenzene at 130–140° C. for 3 hours, during which time ammonia is evolved and an orange crystalline substance is precipitated. The suspension is cooled and the solid product is filtered off, washed with a little o-dichlorobenzene and then with alcohol and dried. The product is identical with the compound of Example 4.

Example 8

1.6 parts of 1:8-naphthylene diamine are stirred with 2.2 parts of 1-imino-3-phenylimino-isoindoline and 6 parts of nitrobenzene at 150° C. for 4 hours. Ammonia is evolved. The suspension is cooled and the reddish yellow crystalline product is filtered off, washed with benzene and alcohol and dried. It is 12-imino-phthaloperine, identical with the product of Example 4.

Example 9

3 parts of 1:8-naphthylene diamine and 5.6 parts of 1:3-di-(phenylimino)-isoindoline are stirred with 13 parts of nitrobenzene at 150° C. for 5 hours. Ammonia is evolved. The mixture is cooled and the orange reaction product is filtered off, washed with benzene and alcohol and dried. It is crystallised from o-dichlorobenzene when it forms orange-yellow needle-shaped crystals. The product is 12-iminophthaloperine identical with the product of Example 4. On analysis the product is found to contain 79.4% of carbon, 4.2% of hydrogen and 15.3% of nitrogen. ($C_{18}H_{11}N_3$ requires 80.3% of carbon, 4.1% of hydrogen and 15.6% of nitrogen.)

Example 10

1 part of 1:8-naphthylene diamine, 2.2 parts of 1-imino-3:3-dibenzylmercapto-isoindoline and 5 parts of nitrobenzene are stirred at 150° C. for 4 hours. The mixture is cooled and the reddish yellow crystalline product is filtered off, washed with a little nitrobenzene then with benzene and alcohol and finally dried. The product is 12-iminophthaloperine, identical with the product of Example 4.

Example 11

2.7 parts of 1:8-naphthylene diamine, 3 parts of dithio-phthalimide (1-thio-3-mercapto-isoindolenine) and 13 parts of nitrobenzene are stirred at 140–150° C. for 2 hours. Ammonia and hydrogen sulphide are evolved during the reaction. The mixture is cooled and the crimson-red crystalline reaction product is filtered off, washed with a little nitrobenzene, then with benzene and alcohol and finally dried. The product is 12-thiophthaloperinone, identical with the product of Example 2.

Example 12

4 parts of 4:5:6:7-tetrahydro-1-imino-3-amino-isoindolenine and 4.3 parts of 1:8-naphthylene diamine are stirred with 25 parts of nitrobenzene at 120° C. for 4 hours. Ammonia is evolved rapidly during the reaction. The mixture is cooled and the orange red crystalline product is filtered off, washed and dried. The product is dissolved in hot xylene and the solution filtered to remove traces of the tetrazaporphin compound formed as a by-product. The filtrate is then cooled and the crystalline product is filtered off and dried. It melts at 202–206° C. and on analysis is found to contain 79.8% of carbon and 6.0% of hydrogen ($C_{18}H_{15}N_3$ requires 79.1% of carbon and 5.5% of hydrogen.)

Example 13

5 parts of 1:8-naphthylene diamine, 7.7 parts of 5-phenyl-1-imino-3-amino-isoindolenine and 38 parts of nitrobenzene are stirred at 120–130° C. for 4 hours, during which time ammonia is evolved. The mixture is allowed to cool and the orange crystalline product which separates is filtered off, washed and dried. It melts at 230–240° C. and is probably composed of a mixture of 9- and 10-phenyl-12-iminophthalo-perines. On analysis it is found to contain 83.6% of carbon and 5.0% of hydrogen. ($C_{24}H_{15}N_3$ requires 83.45% of carbon and 4.35% of hydrogen.)

Example 14

30 parts of 1:8-naphthylenediamine and 40 parts of α:β-diphenyl-fumaronitrile are added, gradually to a solution of 0.42 part of sodium in 80 parts of methanol and the mixture is stirred and boiled under a reflux condenser for 5 hours. The mixture is cooled and the solid product which separates out is filtered off, washed with methanol and dried. The solid so obtained, which consists of a mixture of octaphenyltetrazaporphin and the required 8:9-diphenyl-10-iminopyrrolo[1:2-α]-perimidine, is stirred with 800 parts of hot benzene. The suspension is filtered and the filtrates cooled when the 8:9-diphenyl-10-iminopyrrolo[1:2-α]-perimidine crystallises out and the crystals are filtered off and dried. The product so obtained is crystallised from toluene when it is obtained in the form of crimson needles which melt at 244° C. On analysis the product is found to contain 84.6% of carbon and 4.5% of hydrogen. ($C_{26}H_{17}N_3$ requires 84.1% of carbon and 4.6% of hydrogen.)

Example 15

3.7 parts of 1:8-naphthylenediamine and 6.0 parts of 2:5-diimino-3:4-diphenyl-pyrroline are added to 30 parts of chlorobenzene and the mixture is stirred and heated under a reflux condenser at 120° C. for 5 hours. The mixture is cooled and the dark purplish crystalline product is filtered off, washed with benzene and dried. The solid so obtained which consists of a mixture of octaphenyl-tetraza-porphin and the required diphenylimino compound is stirred with hot benzene, the suspension is filtered and the filtrates cooled. The crystalline solid which separates out is filtered off and dried. The product so obtained is identical with the product of Example 14.

*Example 16*

7.7 parts of 5-chloro-1:3-diimino-isoindoline and 6.2 parts of 1:8-naphthylenediamine are added to 65 parts of nitrobenzene and the mixture is stirred at 125° C. for 9 hours during which time ammonia is evolved. The mixture is cooled and the chloro-1:2-iminophthaloperine which separates out is filtered off, washed with benzene and dried. It is crystallised from o-dichlorobenzene when it forms small red brown needle-shaped crystals which melt at 245–250° C.

*Example 17*

In place of the 7.7 parts of 5-chloro-1:3-diimino-isoindoline used in Example 16 there are used 7.45 parts of 5-nitro-1:3-diimino-isoindoline. The nitro-12-iminophthaloperine so obtained crystallises from o-dichlorobenzene in small maroon needle-shaped crystals which melt at 297–300° C. On analysis the product is found to contain 68.5% of carbon and 3.3% of hydrogen. ($C_{18}H_{10}N_4O_2$ requires 68.7% of carbon and 3.2% of hydrogen.)

What we claim is:
1. Polycyclic compounds having a formula selected from the group consisting of

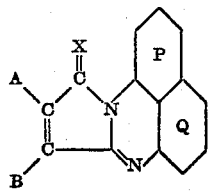

and

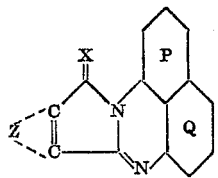

wherein A and B are monocyclic aryl radicals, Z represents the atoms necessary to complete a ring selected from the group consisting of benzene and tetrahydrobenzene rings, X is selected from the group consisting of $Cl_2$, $Br_2$, S and NH, and the nuclei P and Q carry substituents selected from the group consisting of hydrogen, halogen, alkoxy and the ethylene radical connected to the carbon atoms in the peri positions.

2. A process for the manufacture of the compounds of claim 1 wherein X stands for NH, which comprises heating a 1:8-naphthylene diamine with a compound having a formula selected from the group consisting of

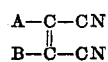

and

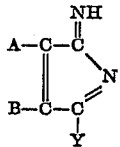

wherein A and B have the meaning specified in claim 1 and Y is selected from the group consisting of O-alkyl, —SH, —S-alkyl, —$NH_2$ and —NH hydrocarbon.

3. 12:12-dichlorophthaloperine.
4. 12-thiophthaloperinone.
5. 12-imino-phthaloperine.
6. 9-phenyl-12-iminophthalo-perine.
7. 10-phenyl-12-iminophthalo-perine.

References Cited in the file of this patent

Hodgen et al.: J. Chem. Soc. (London), 1945, pages 543–5.

Sacks et al.: Annalen der Chemie, 1909, vol. 365, pp. 53–134.